United States Patent
Dutta et al.

(10) Patent No.: US 6,901,585 B2
(45) Date of Patent: May 31, 2005

(54) ACTIVE ALT TAG IN HTML DOCUMENTS TO INCREASE THE ACCESSIBILITY TO USERS WITH VISUAL, AUDIO IMPAIRMENT

(75) Inventors: Rabindranath Dutta, Austin, TX (US); Janani Janakiraman, Austin, TX (US); Richard Scott Schwerdtfeger, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 840 days.

(21) Appl. No.: 09/833,410

(22) Filed: Apr. 12, 2001

(65) Prior Publication Data

US 2002/0152283 A1 Oct. 17, 2002

(51) Int. Cl.[7] .................................................. G06F 9/45
(52) U.S. Cl. ........................... 717/143; 717/141; 704/2; 704/5; 704/7; 704/8; 715/500; 715/515; 345/219; 345/760
(58) Field of Search ................................ 709/218, 219; 715/500, 515; 345/219, 760, 805; 704/2, 5, 7, 8; 717/141, 143

(56) References Cited

U.S. PATENT DOCUMENTS

| | | | |
|---|---|---|---|
| 5,748,188 A | 5/1998 | Hu et al. | 345/326 |
| 5,911,776 A | 6/1999 | Guck | 709/217 |
| 5,937,417 A | 8/1999 | Nielsen | 707/513 |
| 6,052,676 A * | 4/2000 | Hekmatpour | 706/11 |
| 6,078,935 A | 6/2000 | Nielsen | 707/513 |
| 6,115,686 A | 9/2000 | Chung et al. | 704/260 |
| 6,161,112 A | 12/2000 | Cragun et al. | 707/501 |
| 6,188,401 B1 * | 2/2001 | Peyer | 345/805 |
| 6,233,010 B1 * | 5/2001 | Roberts et al. | 348/240.99 |
| 6,717,593 B1 * | 4/2004 | Jennings | 345/760 |
| 6,741,242 B1 * | 5/2004 | Itoh et al. | 345/419 |
| 6,748,391 B1 * | 6/2004 | Schwerdtfeger et al. | 707/102 |
| 6,768,999 B2 * | 7/2004 | Prager et al. | 707/102 |
| 2002/0035697 A1 * | 3/2002 | McCurdy et al. | 713/200 |
| 2003/0023953 A1 * | 1/2003 | Lucassen et al. | 717/106 |

FOREIGN PATENT DOCUMENTS

| | | | |
|---|---|---|---|
| GB | 2188176 | 9/1987 | G06F/15/40 |
| GB | 2293473 | 3/1996 | G08C/23/02 |
| WO | WO 00/45304 | 8/2000 | G06F/17/30 |

OTHER PUBLICATIONS

A Multimedia Document Model for Continuous Media, Emery et al., Sep. 1993, pp. 640–643, vol.–2, IEEE.*
A Market Based Economic Model for Multi–Media Object Storage and Distribution, Narayan et al., Aug. 1995, pp. 118–125, IEEE.*

* cited by examiner

*Primary Examiner*—Ramesh Patel
(74) *Attorney, Agent, or Firm*—Duke W. Yee; Marilyn Smith Dawkins; Gerald H. Glanzman

(57) ABSTRACT

A method, program and system for providing access to alternate formats within an electronic document are provided. The invention comprises parsing a web page and creating a document object model (DOM), and then parsing the alternate format attribute of an image element within the DOM. The browser then displays the web page containing an image (or images) according to the default settings of the browser. A user interface is specified which allows the user to select alternate formats for the default image. This user interface may be in the form of a pop up menu that is presented to the user in response to an input command, such as a right mouse click on the default image. The user can then select an alternate format which replaces the original image in the web page. Alternate formats may include text, audio, or tactile formats.

21 Claims, 3 Drawing Sheets

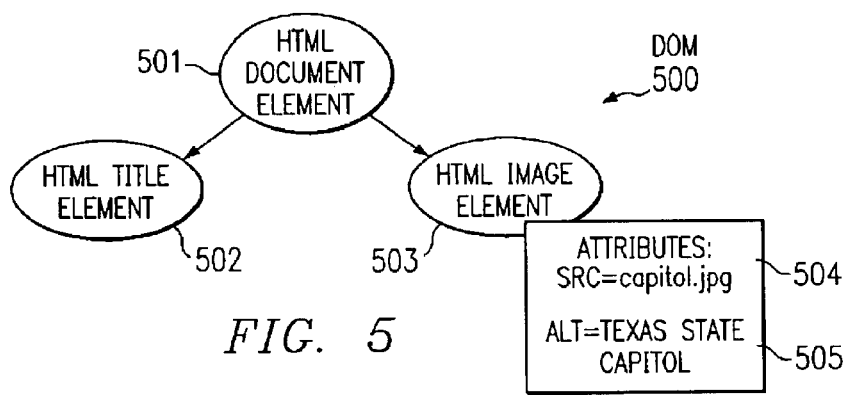
FIG. 5
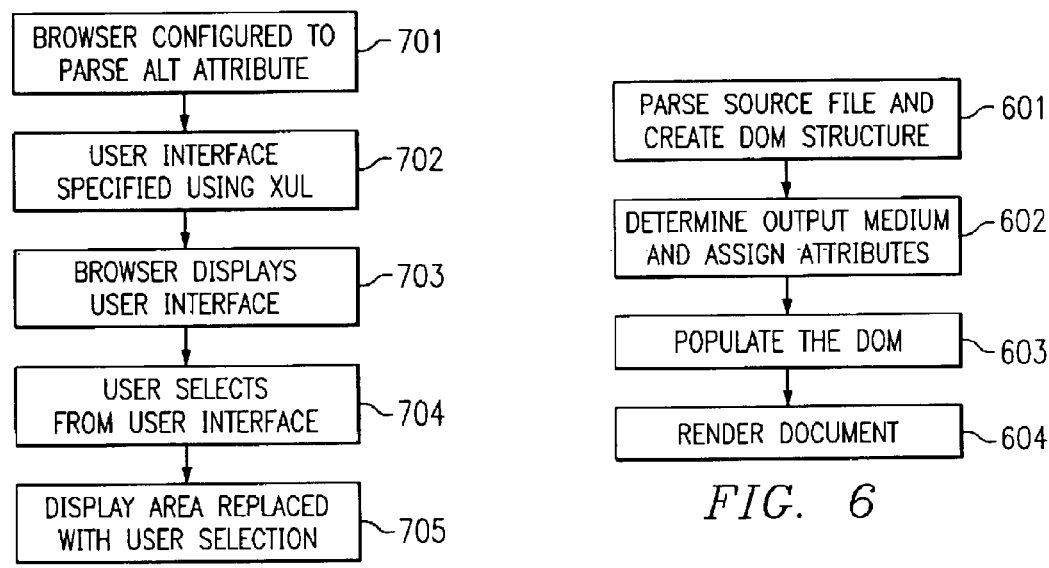
FIG. 7
FIG. 6
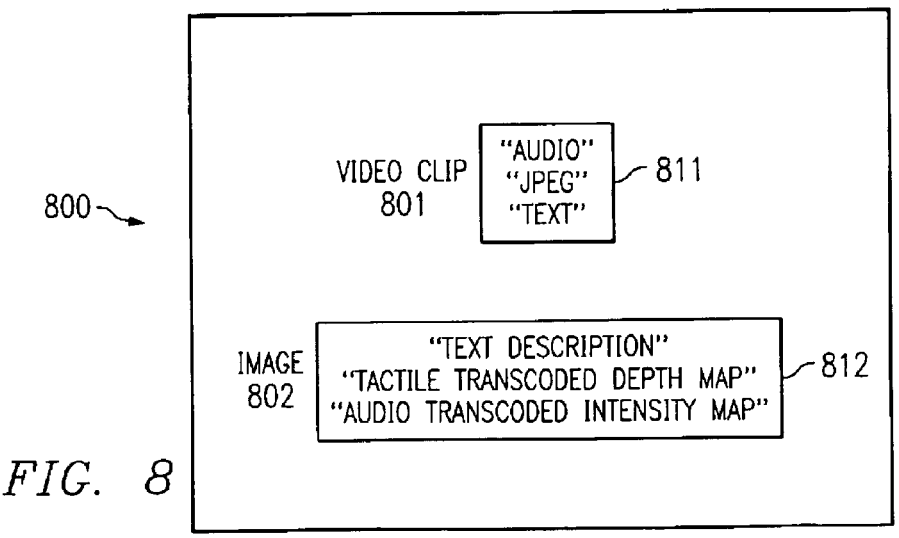
FIG. 8

ACTIVE ALT TAG IN HTML DOCUMENTS TO INCREASE THE ACCESSIBILITY TO USERS WITH VISUAL, AUDIO IMPAIRMENT

BACKGROUND OF THE INVENTION

1. Technical Field

The present invention relates to computer network environments. More specifically, the present invention relates to accessing electronic documents.

2. Description of Related Art

Information on the World Wide Web is typically made available by structuring the information into a visual presentation. Hypertext Markup Language (HTML) is used by the web author to define the visual structure. The end user is presented with this information by viewing the information on a computer display, after the information has been rendered into a visual format by a web browser (e.g. Netscape Navigator or Microsoft Internet Explorer).

Web pages are often created with various multimedia resources such as Video Clip, Audio, and Images. The web designer normally selects a primary format which will make the maximum impact on a normal user. Sometimes these multimedia formats may not be appropriate for users with various visual or hearing impairments.

Currently, well designed web pages use the HTML ALT tags to specify alternate resource formats for a multimedia resource. For example, a video clip may be specified as a primary format. The clip's text equivalent or audio version may be specified as the alternate format. Users, using the browser settings, may turn off the primary format and instead access the alternate format. However, the setting in a browser must be applied to the whole page, until the browser setting is changed.

Therefore, a more flexible approach for selecting alternate web page formats would be desirable.

SUMMARY OF THE INVENTION

The present invention provides a method, program and system for providing access to alternate formats within an electronic document. The invention comprises parsing a web page and creating a document object model (DOM), and then parsing the alternate format attribute of an image element within the DOM. A browser then displays the web page containing an image (or images) according to the default settings of the browser. A user interface is specified which allows the user to select alternate formats for the default image. This user interface may be in the form of a pop up menu that is presented to the user in response to an input command, such as a right mouse click on the default image. The user can then select an alternate format which replaces the original image in the web page. Alternate formats may include text, audio, or tactile formats.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a block diagram illustrating a Document Object Model in accordance with the prior art;

FIG. 6 depicts a flowchart illustrating the processing of an HTML document in accordance with the prior art;

FIG. 7 depicts a flowchart illustrating the use of active ALT tags in accordance with the present invention; and FIG. 8 depicts a pictorial diagram illustrating ALT menu on a web page in accordance with the present invention.

DETAILED DESCRIPTION OF THE PREFERRED EMBODIMENT

Figure 1:
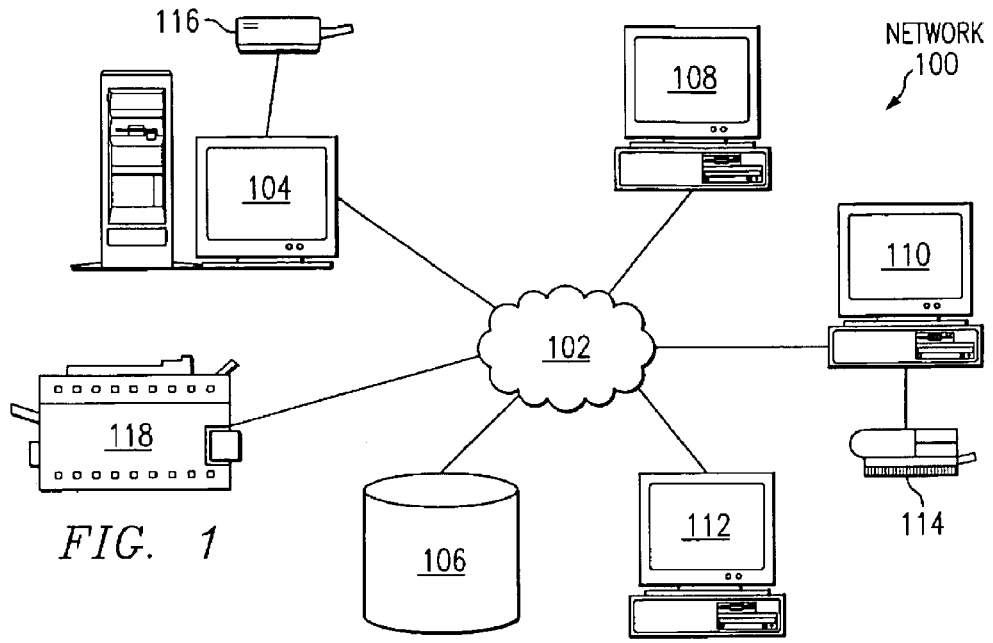
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
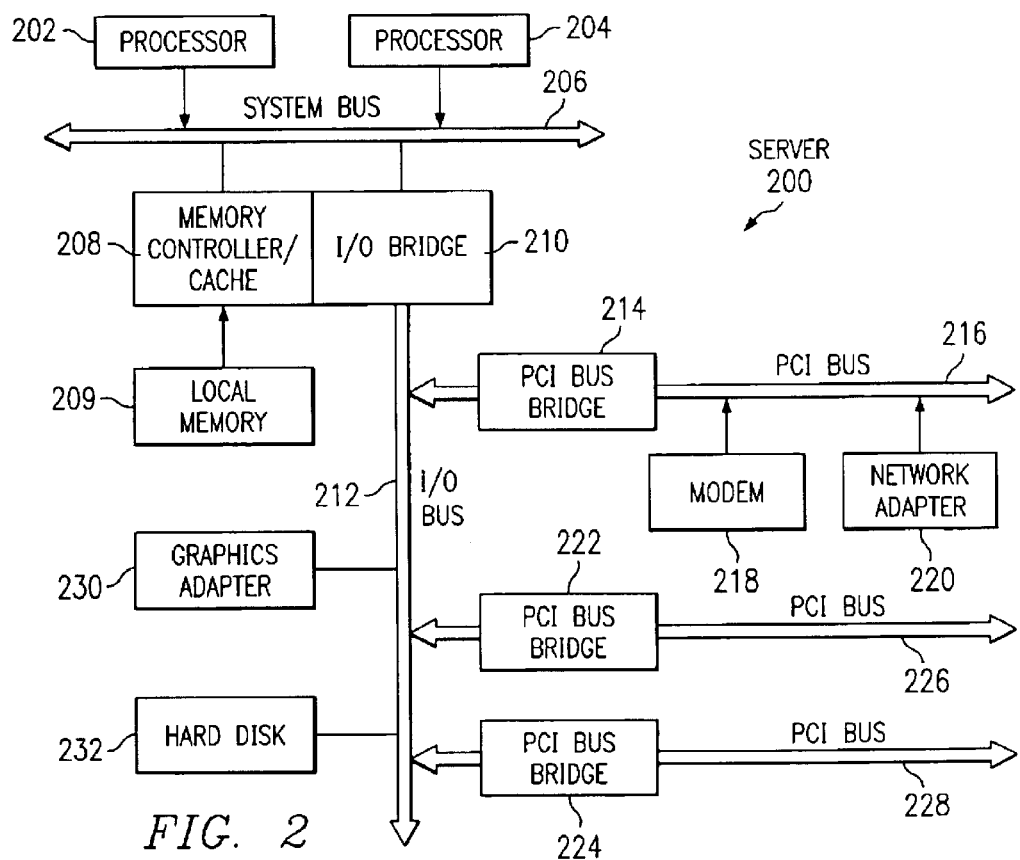
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
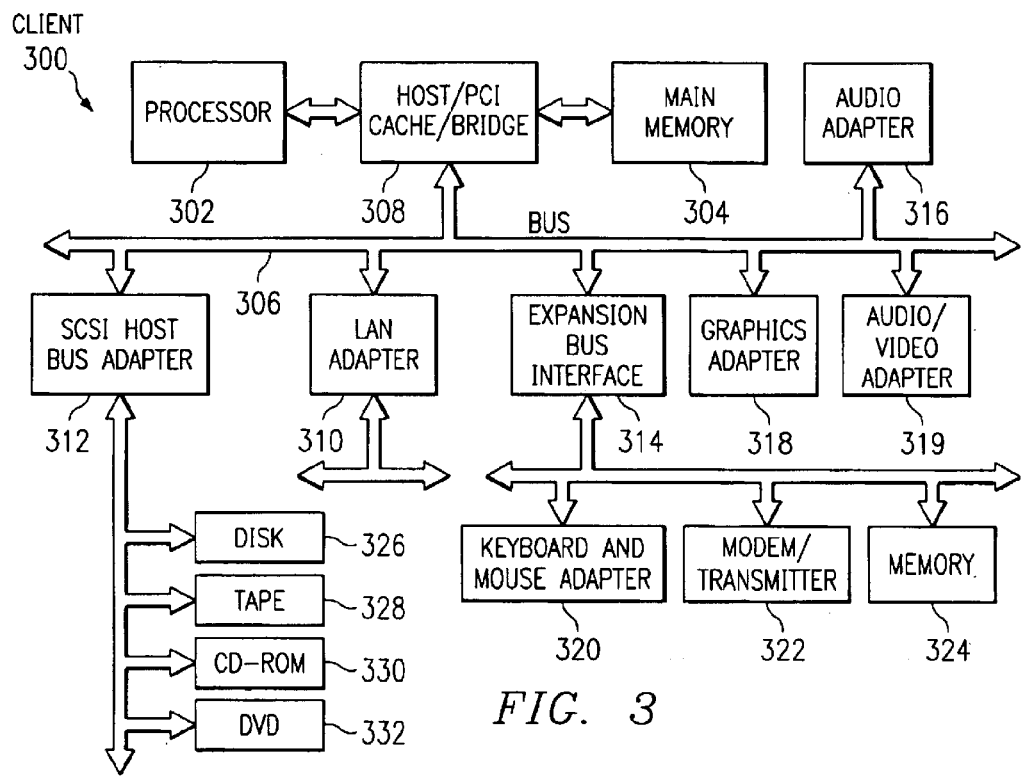
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
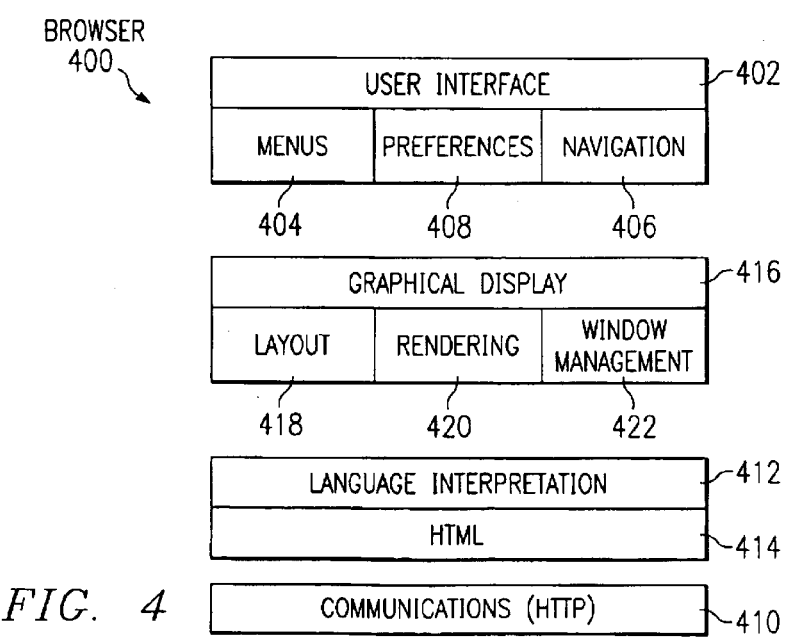
FIG. 4 depicts a block diagram of a browser program in accordance with a preferred embodiment of the present invention.

Turning next to FIG. 4, a block diagram of a browser program is depicted in accordance with a preferred embodiment of the present invention. Browser 400 includes a user interface 402, which is a graphical user interface (GUI) that allows the user to interface or communicate with browser 400. This interface provides for selection of various functions through menus 404 and allows for navigation through the navigation button 406 or selections. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Preferences may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. However, other protocols are possible. Documents that are received by browser 400 are processed by language interpretation 412, which includes an HTML unit 414. Language interpretation 412 will process a document for presentation on graphical display 416. In particular, HTML statements are processed by HTML unit 414 for presentation.

Graphical display 416 includes layout unit 418, rendering unit 420, and window management 422. These units are involved in presenting web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. As used herein, the term "browser" encompasses any software application used to view or navigate for information or data (e.g., something that assist a user to browser) in a distributed data base where the distributed database is typically the Internet or World Wide Web.

Referring to FIG. 5, a block diagram illustrating a Document Object Model is depicted in accordance with the prior art. HTML, which is used to provide a visual structure to a web page, also provides a semantic structure to the page. Well known techniques exist for parsing an HTML source file into a parse tree, in which the various structural elements and relationships among the elements are apparent from the topology of the parse tree. The parse tree is also called a Document Object Model (DOM). The document represented by DOM 500 has been parsed into its main components: HTML Document Element 501, HTML Title element 502, and HTML Image element 503. The HTML document element 501 is the root of the HTML document represented by DOM 500. In addition, FIG. 5 depicts the attributes of image element 503. These attributes include source (SRC) 504 and alternative (ALT) 505.

The DOM is a standard developed at the World Wide Web consortium for a platform- and language-independent interface to the structure and content of HTML and Extensible Markup Language (XML) documents. DOM uses Object Management Groups Interface Definition Language (IDL-ISO 14750) to express its object types. In DOM, an HTML or XML document is represented as a hierarchical collection of Node objects. Nodes are joined together in parent/child relationships. The HTML components of DOM add functionality and convenience functions for HTML scripting applications.

Referring to FIG. 6, a flowchart illustrating the processing of an HTML document is depicted in accordance with the prior art. When an HTML file is loaded, the browser parses the document source file and creates an input DOM structure in memory (step 601). The browser formats the DOM structure by determining the output medium and assigning the appropriate attributes to the DOM elements (step 602). The browser then populates the DOM with the elements (step 603) and renders the document objects in the requested medium (step 604).

The present invention provides an "ACTIVE" ALT tag for a multimedia resource that gives the user the ability to choose an appropriate format from a list of alternate formats. The list can be a pop up menu, an audio list, or a tactile menu. The tag can be activated by right clicking or double clicking on a mouse, or by any other means by which options and menus are usually accessed.

Referring to FIG. 7, a flowchart illustrating the use of active ALT tags is depicted in accordance with the present invention. Using the DOM from FIG. 5, the browser is configured to parse the ALT attribute 505 of the HTML image element 503 (step 701). A user interface is specified using XML-based User Interface Language (XUL) (step 702). Open sours browser windows are often designed in XUL, which uses HTML/Cascading Style Sheets (CSS) and the DOM. Commands and actions for the windows are handled mostly with Javascript. Because the user interface is configurable through markup, it is not hard coded in the source. Instead it is loaded at runtime, enabling programmers to tweak the interface without having to recompile the source code. An example of a XUL script to add a pull down menu is as follows:

```
<window>
<menubar>
<menu name="formats">
<menuitem name="depth map" onclick="displaydepthmap( )"/>
<menuitem name="intensity map" onclick="displayintensitymap( )"/>
</menu>
</menubar>
</window>
```

The browser then displays the specified user interface (i.e. selection list box)(step 703), from which the user may select an alternative format (step 704). The selected alternative format then replaces the primary format in the display area of the browser (step 705). This step involves executing the Javascript associated with the list box element selected by the user.

Referring now to FIG. 8, a pictorial diagram illustrating ALT menu on a web page is depicted in accordance with the present invention. The web page 800 has two multimedia resources: a video clip 801 and an image 802. In the present invention, after a web page is displayed, the user right clicks on an image he wants to view in an alternate format. The browser looks through the DOM of the page, picks up the Javascript associated with the image and pops up the corresponding XUL list box. The user then clicks on an element within the list box, which triggers (again by referring back to the DOM) another event associated with the item and replaces the original image with the format chosen by the user.

In the first instance, in default browser settings, the video clip format 801 is shown. If the user right clicks, for example, on video clip 801 a pop up menu 811 appears containing alternate formats such as audio, jpeg, and text. The user may then select an alternate format from menu 811, which will replace the default video clip 801 in the display.

The other multimedia resource on web page 800 is an image 802. Like video clip 801, image 802 is the primary format selected by the default browser setting. Again, if the user right clicks on image 802 a pop up menu 812 appears containing the alternate formats including text description, tactile transcoded depth map, and audio transcoded intensity map, which can be selected by the user to replace the default image 802.

It should be pointed out that the alternate formats depicted in FIG. 8 are merely examples, as is the use of right clicking with a mouse to view the ALT menu. Numerous alternate formats exist for multimedia resources on web pages, and are well known within the art, as are various methods for accessing pop up menus. In addition, the menu of alternate formats can be presented by non visual means, such as an audio or tactile menu.

The present invention allows users to choose the way they want to access multimedia resources on a per-resource basis, depending on the options available. Users can also choose to access a given resource in multiple formats. The present invention is also useful to users without impairments because the ALT tag information is no longer buried in the HTML code. Users can easily access the tag information to actively choose in which format they wish to access web page contents.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing access to alternate formats within an electronic document, comprising:
    parsing an electronic document;
    parsing an alternate format attribute of a image element in the electronic document;
    displaying the electronic document, wherein the electronic document contains a default image corresponding to said image element;
    specifying a user interface, wherein the user interface allows a user to select alternate formats of the image;
    presenting the user interface in response to a user input command; and
    responsive to receiving user selection, replacing the default image with an alternate representation generated from the alternate format attribute.

2. The method according to claim 1, wherein the step of parsing the electronic document further comprises creating a document object model.

3. The method according to claim 1, wherein the image is a pictorial representation.

4. The method according to claim 1, wherein the image is a video clip.

5. The method according to claim 1, wherein the user interface is a visual menu.

6. The method according to claim 1, wherein the user interface is an audio list.

7. The method according to claim 1, wherein the user interface is a tactile menu.

8. The method according to claim 1, wherein the user interface is presented in response to a right click on a computer mouse.

9. The method according to claim 1, wherein the alternate formats comprise text, audio, and tactile formats.

10. A method for accessing alternate formats within an electronic document, comprising:
    receiving a display of an electronic document which contains a default image;
    entering an input command and receiving a user interface in response, wherein the user interface allows selection of alternate formats for the default image contained in the electronic document;
    selecting an alternative format from the user interface; and
    displaying an alternate representation, in the selected alternate format, in place of the default image in the electronic document.

11. The method according to claim 10, wherein the default image is a pictorial representation.

12. The method according to claim 11, wherein the user interface is an audio list.

13. The method according to claim 11, wherein the user interface is a tactile menu.

14. The method according to claim 11, wherein the user interface is received in response to a right click on a computer mouse.

15. The method according to claim 11, wherein the alternate formats comprise text, audio, and tactile formats.

16. The method according to claim 10, wherein the default image is a video clip.

17. The method according to claim 10, wherein the user interface is a visual menu.

18. A computer program product in a computer readable medium for use in a data processing system, for providing access to alternate formats within an electronic document, the computer program product comprising:
    instructions for parsing an electronic document;
    instructions for parsing an alternate format attribute of an image element in the electronic document;
    instructions for displaying the electronic document, wherein the electronic document contains a default image corresponding to said image element;
    instructions for specifying a user interface, wherein the user interface allows a user to select alternative formats of the image;
    instructions for presenting the user interface in response to a user input command; and
    responsive to receiving user selection input, instructions for replacing the default image with an alternate representation generated from the alternate format attribute.

19. A computer program product in a computer readable medium for use in a data processing system, for accessing alternate formats within an electronic document, comprising:
    instructions for receiving a display of an electronic document which contains a default image;
    instructions for entering an input command and receiving a user interface in response, wherein the user interface allows selection of alternate formats for the default image contained in the electronic document;
    instructions for selecting an alternative format from the user interface; and
    instructions for displaying an alternate representation, in the selected alternate format, in place of the default image in the electronic document.

20. A system for providing access to alternate formats within an electronic document, comprising:
    a first parser which parses an electronic document;
    a second parser which parses an alternate format attribute of an image element in the electronic document;
    a display mechanism which displays the electronic document, wherein the electronic document contains a default image corresponding to said image element;
    a processing component which specifies a user interface, wherein the user interface allows a user to select alternative formats of the image;

a feedback component which presents the user interface in response to a user input command; and an image changer which, responsive to receiving user selection input, replaces the default image with an alternate representation generated from the alternate format attribute.

21. A system for accessing alternate formats within an electronic document, comprising:

a display device which receives and displays an electronic document which contains a default image;

an input/output component which enters an input command and receives a user interface in response, wherein the user interface allows selection of alternate formats for the default image contained in the electronic document;

a selector which selects an alternative format from the user interface; and a receiving component which receives and displays an alternate representation, in the selected alternate format, in place of the default image in the electronic document.

* * * * *